US009024547B2

(12) United States Patent
Vogt

(10) Patent No.: US 9,024,547 B2
(45) Date of Patent: May 5, 2015

(54) FAN CONDUCTED NOISE REDUCTION

(71) Applicant: Randall Vogt, Raleigh, NC (US)

(72) Inventor: Randall Vogt, Raleigh, NC (US)

(73) Assignee: Allied Telesis, Inc., San Jose, CA (US)

( * ) Notice: Subject to any disclaimer, the term of this patent is extended or adjusted under 35 U.S.C. 154(b) by 128 days.

(21) Appl. No.: 13/630,585

(22) Filed: Sep. 28, 2012

(65) Prior Publication Data
US 2014/0091735 A1  Apr. 3, 2014

(51) Int. Cl.
F04D 15/00 (2006.01)
H02P 3/00 (2006.01)
H02P 7/28 (2006.01)

(52) U.S. Cl.
CPC ........................................ H02P 7/28 (2013.01)

(58) Field of Classification Search
USPC ........ 318/3, 434, 466, 471, 461, 490, 400.03, 318/400.13
See application file for complete search history.

(56) References Cited

U.S. PATENT DOCUMENTS

| 5,268,623 | A | * | 12/1993 | Muller | 318/434 |
| 6,717,380 | B1 | * | 4/2004 | Sutter et al. | 318/400.03 |
| 6,768,282 | B2 | * | 7/2004 | Lutter et al. | 318/603 |
| 8,138,712 | B2 | * | 3/2012 | Yamada | 318/807 |
| 2003/0122515 | A1 | * | 7/2003 | Lutter et al. | 318/466 |
| 2004/0178759 | A1 | * | 9/2004 | Nakamura et al. | 318/471 |
| 2006/0145639 | A1 | * | 7/2006 | Song et al. | 318/254 |
| 2007/0274015 | A1 | * | 11/2007 | Isham | 361/93.1 |
| 2008/0079380 | A1 | * | 4/2008 | Knittel et al. | 318/490 |
| 2009/0254300 | A1 | * | 10/2009 | Schneider et al. | 702/145 |
| 2009/0278484 | A1 | | 11/2009 | Nair et al. | |
| 2010/0164416 | A1 | * | 7/2010 | Yamada | 318/400.13 |
| 2010/0171456 | A1 | * | 7/2010 | Chakrabarti et al. | 318/461 |
| 2010/0171457 | A1 | * | 7/2010 | Letor et al. | 318/490 |

* cited by examiner

Primary Examiner — Paul Ip

(57) ABSTRACT

Apparatus and methods for reducing unwanted conducted noise generated by a DC load 17. Load 17 is powered by a voltage source 11. A current sense 13 senses pulse current $I_{fan}$ flowing through the load 17. First converting means 14, 15, 16 converts the sensed pulse current $I_{fan}$ to a correction voltage $V_p$. The correction voltage $V_p$ is then converted to a correction current $I_p$, which offsets the deleterious effects of $I_{fan}$. The current $I_s$ flowing through the voltage source 11 equals $I_{fan}$ plus the correction current $I_p$.

20 Claims, 4 Drawing Sheets

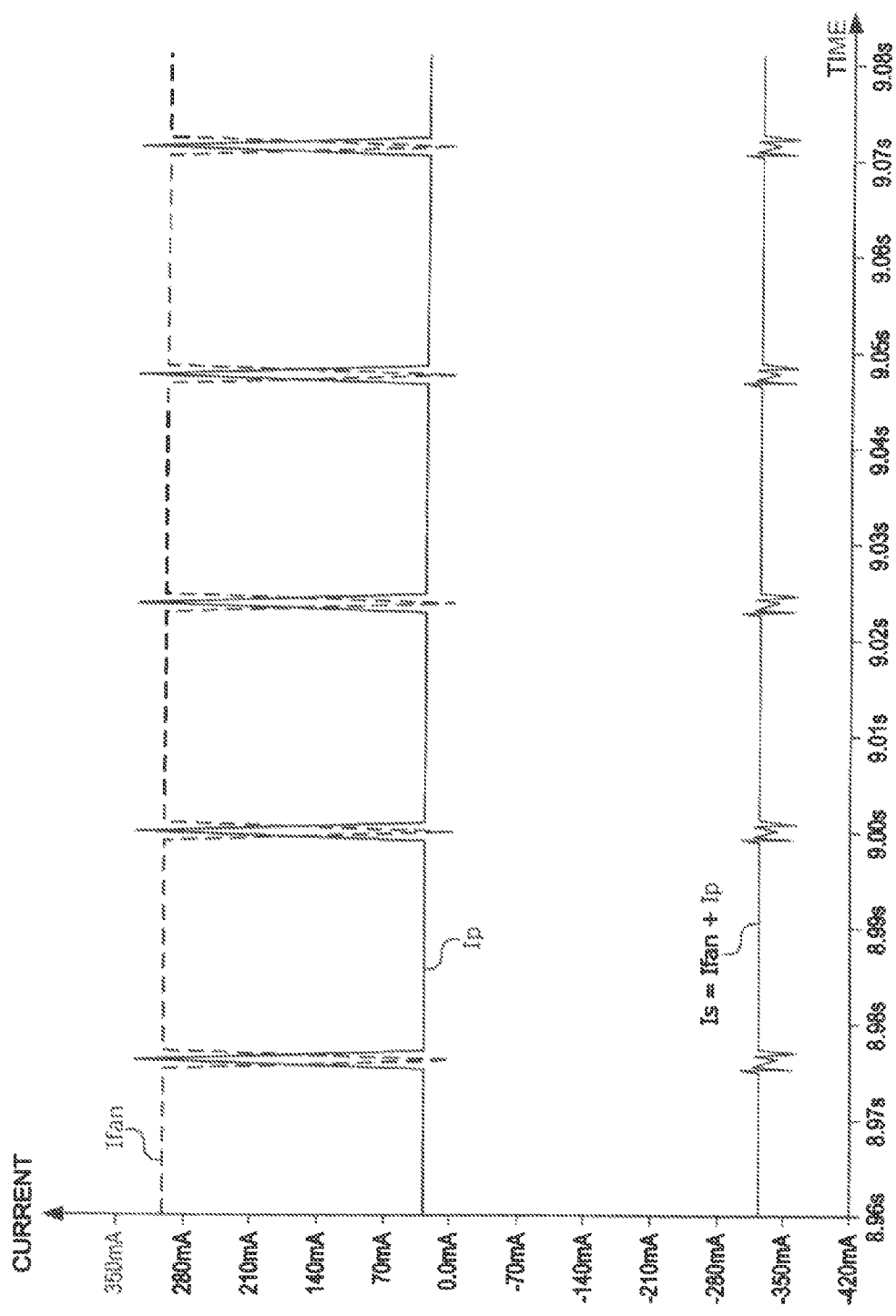

FAN CONDUCTED NOISE REDUCTION

TECHNICAL FIELD

The embodiments pertain to reduction of conducted noise in direct current brushless fans used in network communication applications, and can also be used to reduce conducted noise emanating from other DC loads. The embodiments can be incorporated in the fan(s), or incorporated in the controlling electronics circuitry.

BACKGROUND ART

Direct Current (DC) fans are predominantly used to cool electronic equipment. The fans are typically brushless in design, to reduce cost and improve reliability. The commutation of the fan generates a current pulse on the power source. This current pulse varies in amplitude and frequency, proportional to the fan speed. Typically, the current pulse ranges from 0 Hz to 500 Hz, and may also exhibit harmonics well into the 10 kHz to 20 kHz range.

Regulatory agencies are now requiring the conducted noise in the voice band to be below low levels, for example 9+10 logIc (dBrnC), where Ic is the maximum measured input current on the power port of the telecommunications equipment. Equipment that is designed to measure analog signals with C-Message weighting is specified to measure the noise. Typically, this is performed using a Transmission Impairment Measurement Set (TIMS) that is used for measurements on Plain Old Telephone Systems (POTS). The term dBrnC is a decibel relative measurement with C-Message weighting, and is specified as dBrnC=dBm+90. Thus, as an example, an input current of 2A results in a limit of 12 dBrnC. Applying the conversion formula results in an absolute value of 12 dBrnC−90=−78 dBm in the voice band range.

Attenuating noise down to this low of a level can be achieved using a passive low-pass filter consisting of inductors, capacitors, and resistors on the power supply to the fan(s) or on the power supply port of the equipment cooled by the fan(s). The size of the filter components can increase significantly, depending on the current level required on the power port. Passive low-pass filters are widely used technology having moderate cost. However, using low pass filters causes significant pressure on the volume available to house all the components, depending on the level of attenuation and current rating.

Another method used to reduce the noise level is to use Pulse Width Modulation (PWM) on the fan power input. In the case where multiple fans are used in a system, the fans' PWM drives are driven out of phase with each other to minimize the additive current pulses. U.S. published patent application 2009/0278484 A1 dated Nov. 12, 2009 shows one example of incorporating this method.

DISCLOSURE

The present embodiments counteract the effects of the undesired current pulses $I_{fan}$ using an active filter to cancel out the current pulses $I_{fan}$, so that a steady current $I_s$ is seen at the fan power source 11. This method advantageously allows the use of small integrated circuits that can be incorporated in the housing(s) for the fan(s) 17, or else incorporated at the power source 11 driving the fan(s) 17. This can be achieved with small component volume and moderate cost.

The present embodiments measure the undesired current pulse $I_{fan}$ and translates this pulse to voltage. Then a mathematical function $V_{average}-V_{pulse}=V_P$ is performed using integrated circuits such as operational amplifiers. The correction voltage $V_p$ is then presented to a voltage controlled current source or current sink 12, connected in parallel to the fan power source 11, that adds a counteracting current pulse $I_p$ back to the source 11 to achieve a steady current $I_s$. This operation is represented by the formula $I_s=I_{fan}+I_p$. Thus, noise reduction at the system power input 11 is achieved.

The present embodiments perform the noise canceling independent of fan 17 speed. Thus, filtering down to low frequencies approaching 0 Hz can be achieved.

BRIEF DESCRIPTION OF THE DRAWINGS

These and other more detailed and specific objects and features of the present invention are more fully disclosed in the following specification, reference being had to the accompanying drawings, in which:

FIG. 4 illustrates a circuit simulation of $I_s=I_{fan}+I_p$, using Linear Technologies LTspice IV circuit simulation software.

DETAILED DESCRIPTION

Figure 1:
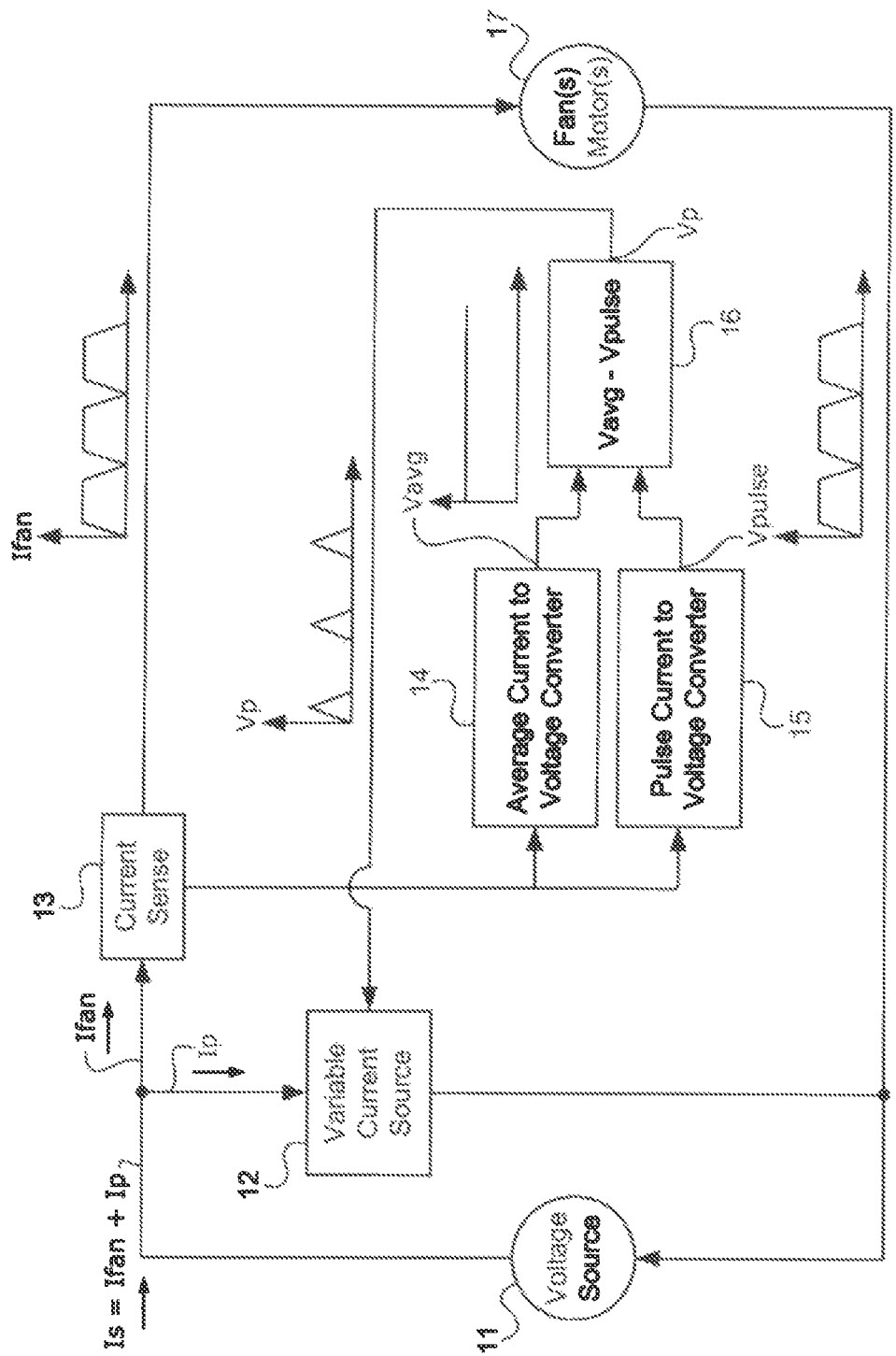
FIG. 1 illustrates a block diagram according to one embodiment.

The embodiments will now be described more fully hereinafter with reference to the accompanying drawings. The embodiments may, however, be embodied in different forms, and should therefore not be construed as limited to the embodiments set forth herein. In the Figures, the dimensions of elements may be exaggerated for clarity of illustration. Like reference characters refer to like elements throughout.

The FIG. 1 block diagram describes one embodiment for configuration and control methodology. Normally, when no filtering is implemented, voltage source 11 is connected directly to the fan motor(s) 17. An unwanted current pulse, $I_{fan}$ is generated due to the fan 17 commutation, and is seen by the voltage source 11.

In one embodiment, a current sense 13 is placed in series between the voltage source 11 and fan motor(s) 17 to provide a current measurement of $I_{fan}$. The current $I_{fan}$ is then converted to voltage, to allow the above-mentioned mathematical function to be performed.

An average current to voltage converter 14, placed at the output of current sense 13, performs an average current to average voltage ($V_{avg}$) conversion. A pulse current to voltage converter 15 is also placed at the output of current sense 13, and performs a conversion of pulse current to pulse voltage ($V_{pulse}$). A $V_{avg}-V_{pulse}$ subtraction module 16, located at the output of converters 14 and 15, then performs the mathematical function to generate the correction voltage $V_p$.

$V_p$ is then introduced to the control input of variable current source (or sink) 12, which converts the pulse correction voltage $V_p$ to pulse correction current $I_p$. The pulse correction current $I_p$ is the antidote to the unwanted current pulse $I_{fan}$, and is automatically added back to the source current $I_s$ by the topology of the circuit by the relationship $I_s=I_{fan}+I_p$. This results in a substantially steady current $I_p$, and therefore minimizes noise generated by current ripple at voltage source 11.

Figure 2:
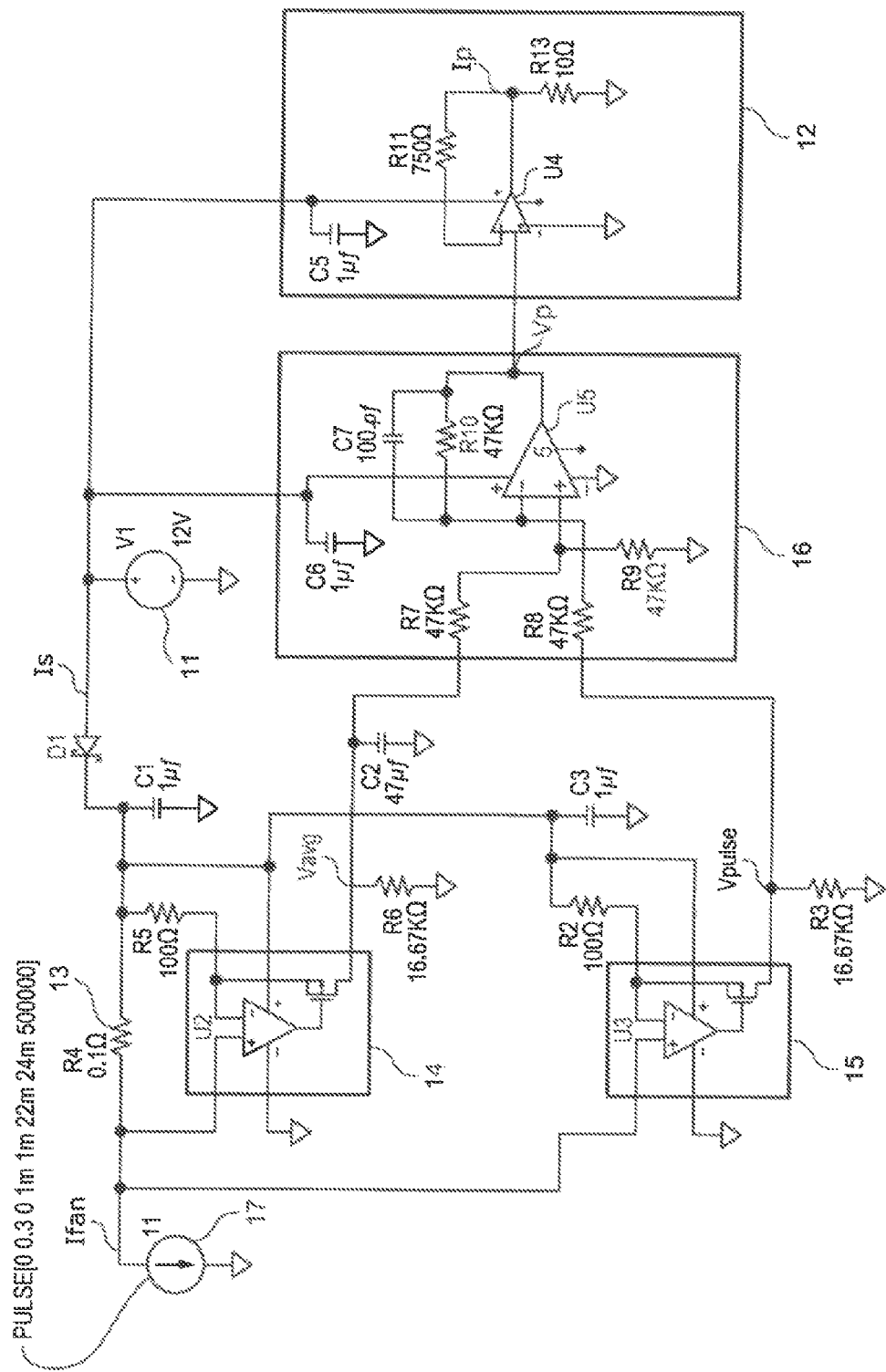
FIG. 2 illustrates an example of a circuit that can be used to perform the functions described in FIG. 1.

The FIG. 2 schematic diagram represents one embodiment that can be used to implement the control methodology described in FIG. 1. There are many other possible and feasible methods to convert current to voltage to apply the mathematical function $V_p=V_{avg}-V_{pulse}$ and there are many other possible and feasible methods to implement a voltage to current conversion to generate $I_p$, other than the ones shown in FIG. 2.

Generally, the values for the various components shown on FIG. 2 are typical values.

Diode D1 is used to set the direction of current flow. It is typically a MBRS130L.

In FIG. 2, voltage source 11 is represented as V1, and the fan motor(s)' 17 pulse current $I_{fan}$ is represented as I1. The current sense 13 is achieved by passing $I_{fan}$ through resistor R4. This converts the current $I_{fan}$ to a low voltage value. The value of R4 is typically kept very low to keep the voltage drop low, so that the operating voltage of the fan(s) 17 is not appreciably affected.

The low voltage value representing $I_{fan}$ is then amplified using current sense amplifiers U2 and U3 (embodying modules 14 and 15, respectively). In this example, U2 and U3 are Linear Technology, Inc. LTC6101 High Voltage, High-Side Current Sense Amplifiers.

$V_{avg}$ is generated by U2, and $V_{pulse}$ is generated by U3.

The output voltage of U2 is determined by the equation $V_{avg}=V_{R4}\times R6/R5$. $V_{avg}$ is still a pulse at the output of U2. Thus, a capacitor C2 is used to smooth the pulse to represent the average voltage to the input of module 16.

The output voltage of U3 is determined by the equation $V_{pulse}=V_{R4}\times R3/R2$.

The mathematical function $V_P=V_{avg}-V_{Pulse}$ (module 16) is implemented using a typical differential amplifier, U5, with accompanying components R7, R8, R9, R10, C6, and C7. U5 is typically a Linear Technology 1784. The differential amplifier U5 can be embodied by many other known implementations.

$V_p$ is then converted to current $I_p$ (at module 12) using a current feedback amplifier, U4, with accompanying components R11, R13, and C5. These components implement variable current source 12. U4 is typically a Linear Technology 1206. The current source 12 (which can also be a current sink) can also be embodied by many other known implementations.

Figure 3:
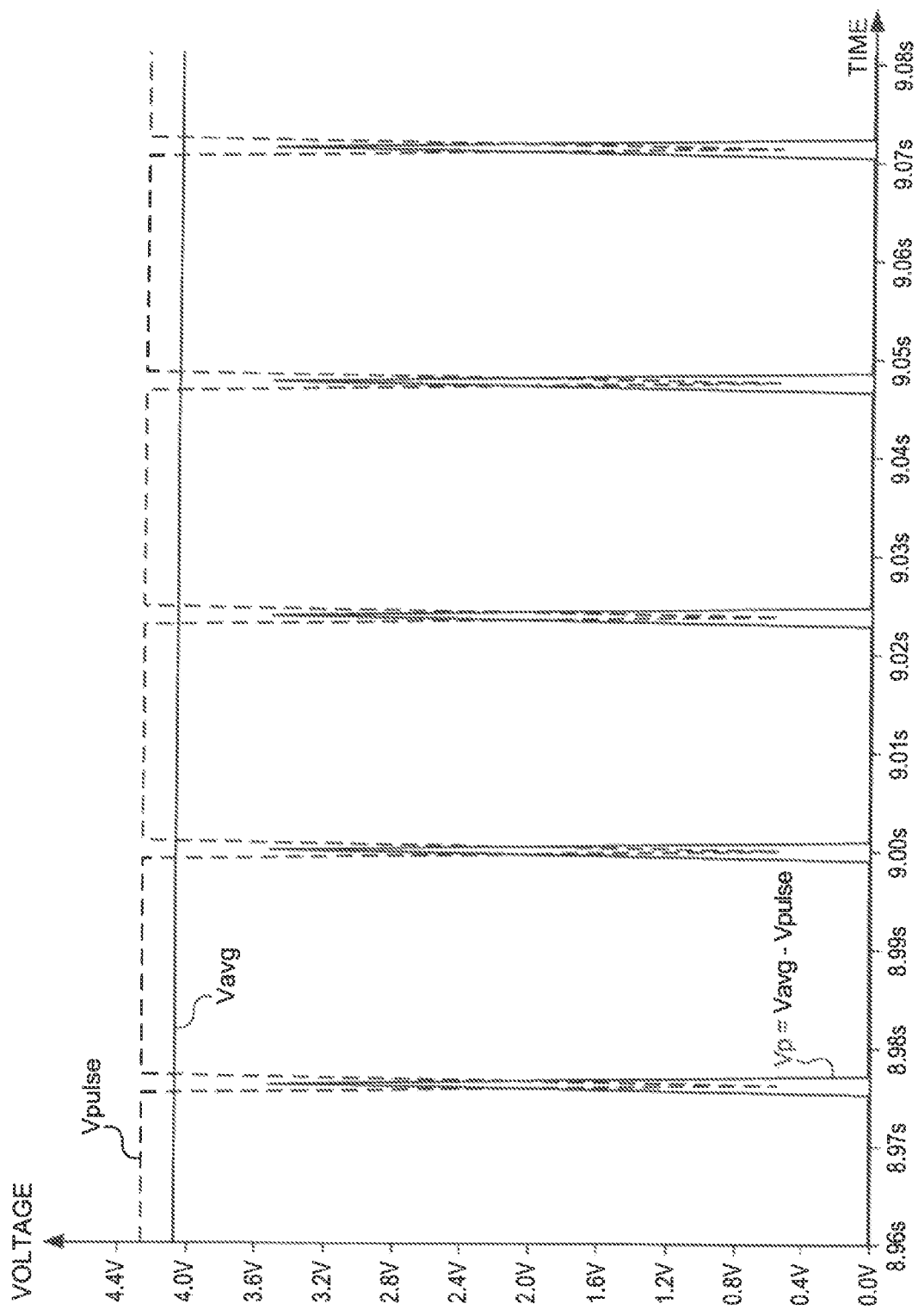
FIG. 3 illustrates a circuit simulation of $V_p=V_{avg}-V_{pulse}$, using Linear Technologies LTspice IV circuit simulation software.

FIG. 3 and FIG. 4 are simulations of the circuit shown in FIG. 2, using Linear Technology, Inc. LTSpice IV circuit simulation software.

FIG. 3 shows $V_p=V_{avg}-V_{pulse}$ waveforms.

FIG. 4 shows $I_s=I_{fan}+I_P$ waveforms, and illustrates that the current ripple on $I_s$ is greatly reduced, thus reducing noise levels measured on the voltage source 17.

The above description is included to illustrate the operation of some embodiments, and is not meant to limit the scope. From the above discussion, many variations will be apparent to one skilled in the art that would yet be encompassed by the spirit and scope of the embodiments. For example, the invention can be used to reduce unwanted conducted noise generated by any DC load, not just fans.

What is claimed is:

1. A device comprising:
    a motor;
    a current sense configured to measure unwanted current generated by the motor, wherein the unwanted current generates noise;
    a first converter configured to generate an averaged voltage based on the measured unwanted current;
    a second converter configured to generate a pulse voltage based on the measured unwanted current; and
    a subtraction module configured to generate a correction voltage for reducing the unwanted current, wherein the correction voltage is the averaged voltage less the pulse voltage.

2. The device as described in claim 1, wherein the motor is a brushless DC motor.

3. The device as described in claim 1, further comprising:
    a variable current source configured to receive the correction voltage and further configured to remove current associated with the correction voltage from a current source supplying power to the motor, wherein removal of the current associated with the correction voltage counteracts the unwanted current generated by the motor.

4. The device as described in claim 3, wherein the variable current source includes a current feedback amplifier.

5. The device as described in claim 1, wherein output of the first converter is coupled to the subtraction module, and wherein output of the second converter is coupled to the subtraction module.

6. The device as described in claim 1, wherein the first converter and the second converter each include a current sense amplifier for amplifying the measured unwanted current.

7. The device as described in claim 1, wherein the subtraction module is configured to generate the correction voltage independent of a speed associated with the motor.

8. The device as described in claim 1, wherein the first converter includes a capacitor configured to smooth the pulse voltage.

9. The device as described in claim 1, wherein the motor, the current sense, the first converter, the second converter and the subtraction module are integrated within a same housing.

10. A device comprising:
    a power source configured to supply power to a motor;
    a current sense configured to measure unwanted current generated by the motor, wherein the unwanted current generates noise;
    a first converter configured to generate an averaged voltage based on the measured unwanted current;
    a second converter configured to generate a pulse voltage based on the measured unwanted current; and
    a subtraction module configured to generate a correction voltage for reducing the unwanted current, wherein the correction voltage is the averaged voltage less the pulse voltage.

11. The device as described in claim 10 further comprising:
    a variable current source configured to receive the correction voltage and further configured to remove current associated with the correction voltage from the power, wherein removal of the current associated with the correction voltage counteracts the unwanted current generated by the motor.

12. The device as described in claim 11, wherein the variable current source includes a current feedback amplifier.

13. The device as described in claim 10, wherein output of the first converter is coupled to the subtraction module, and wherein output of the second converter is coupled to the subtraction module.

14. The device as described in claim 10, wherein the first converter and the second converter each include a current sense amplifier for amplifying the measured unwanted current.

15. The device as described in claim 10, wherein the subtraction module is configured to generate the correction voltage independent of a speed associated with the motor.

16. The device as described in claim 10, wherein the first converter includes a capacitor configured to smooth the pulse voltage.

17. The device as described in claim 10, wherein the power source, the current sense, the first converter, the second converter and the subtraction module are integrated within a same housing.

18. A method comprising:
measuring unwanted current generated by a motor, wherein the unwanted current generates noise;
generating an averaged voltage based on the measured unwanted current;
generating a pulse voltage based on the measured unwanted current; and
generating a correction voltage for reducing the unwanted current, wherein the correction voltage is the averaged voltage less the pulse voltage.

19. The method as described in claim 18 further comprising:
receiving the correction voltage; and
removing current associated with the correction voltage from a current source supplying power to the motor, wherein removal of the current associated with the correction voltage counteracts the unwanted current generated by the motor.

20. The method as described in claim 18, wherein the motor is a brushless motor.

\* \* \* \* \*